Patented July 21, 1942

2,290,366

UNITED STATES PATENT OFFICE 2,290,366

METHOD OF MAKING CERAMIC BONDED ARTICLES

Raymond C. Benner and Garret Van Nimwegen, Niagara Falls, N. Y., assignors to The Carborundum Company, Niagara Falls, N. Y., a corporation of Delaware No Drawing. Application February 24, 1939, Serial No. 258,231

7 Claims. (Cl. 106—39)

This invention relates to a process of making ceramic articles and more particularly to a process of making ceramic bonded articles wherein an acid latex is used as a temporary binder.

Ceramic bonded abrasive wheels generally have been made heretofore by one of two processes known as the "pressed wheel process" and the "puddled wheel process." In the pressed wheel process, abrasive, permanent ceramic bond and a small amount of temporary binder are mixed with a small amount of water, just enough water being used to cause cohesion after pressing. In the puddled wheel process a much larger amount of water is used to make the mix fluid enough for casting into molds.

It has also been proposed to form ceramic bonded articles by a casting process in which certain materials are sometimes used as temporary binders that are later burned out to leave the final ceramic bonded article. In this capacity normal rubber latex has been used. Normal rubber latex as generally known is of an alkaline nature because of the addition of ammonia or a similar stabilizing agent to prevent coagulation of the rubber particles on standing before use. Much trouble has been encountered in the use of this normal rubber latex as a temporary binder when used in connection with certain abrasive grains and ceramic bonds in that there is a premature precipitation or coagulation of the mix making the casting operation extremely difficult and at times even impossible.

This disadvantage in the use of alkaline latex for a temporary binder has been found to be caused by the presence in the permanent ceramic bond or abrasive ingredient of materials of an acid nature.

In the ceramic bonding of abrasive granules it is usually preferred to use the ceramic ingredients, at least in part, in their plastic or unfused state because of the added plasticity given to the raw batch, as well as the increased strength of the formed articles in their green or unfired state. A number of these ceramic raw materials are of an acid nature, a common example being boric oxide. This acidic character often persists to a troublesome degree even after a partial fritting of the materials.

Further the abrasives used with these acid ceramic ingredients often are given a preliminary acid treatment to remove constituents that react with acid, such as the sulfides on the surface of some fused alumina abrasives. It is obvious that alkaline latex will not be compatible with either a mixture of acidic ceramic bond components or with acid washed grain in which acidic matter is still present. As a natural result, therefore, premature coagulation of the latex before casting will take place whenever such materials are present in the same mix with normal or alkaline latex.

Having in mind the uncompatibility of alkaline latex and ceramic materials of an acidic nature, it is the object of the present invention to provide a mixture of acidic ceramic materials and latex which will be stable prior to casting.

Another object of the present invention is to provide a mixture of ceramic materials and a more plastic adhesive rubber.

We accomplish these objects and others ancillary thereto by the use of an acid latex with the acidic ceramic materials. A lesser amount of latex is required when using acid latex because of its higher plasticity and greater adhesion for the abrasive particles. In addition to retaining a high plasticity of the mix, the formed articles possess a high green strength. Wheels of higher density can also be made because of the ability to use less latex in the casting mix. Greater stability toward the coagulative influence of the abrasive granules and permanent bond is obtained with acid latex, as previously mentioned.

A further advantage of using an acid latex is that it avoids the objectionable odor to the operator of the ammonia vapors normally present and given off during the use of standard preserved latices.

In practicing our invention, the acidic ceramic materials including the abrasive granules are mixed directly with the acid latex which has been stabilized by the addition of a small amount of gelatin, dextrin or other similar stabilizers, and cast into a suitable mold. The formed article is then dried and fired to burn off the organic matter and to unite the ceramic bond.

In carrying out our invention, it is first necessary to prepare a quantity of acid latex for use in the process. An acid latex having a pH value of 4½–7 has been found to give the most satisfactory results when used in the present process. Such acid latex may be made in a number of well known ways; however, the method of making acid latex does not itself constitute a part of the present invention. One of the ways that we have found satisfactory in making quantities of acid latex for use in our process is given briefly as follows:

Standard ammonia-preserved latex is first treated to remove the ammonia by blowing, or alternatively it may be neutralized by the use of formaldehyde, whereupon the latex has a pH value of roughly 7 to 8. At this stage of the procedure and before further acidification a suitable stabilizer, such as gelatin, dextrin, sulphonated napthalene derivatives, or the like are added to improve the final stability of the acid latex. For this purpose a stabilizer is required which is unaffected by the acidifying agent and is capable of protecting the latex particles during the reversal of their charge. Then as a final step and in order to give a distinctly acid pH, of between 4½–7, to the latex which has been de-ammoniated and neutralized as above, 4% of formaldehyde solution is added to the latex, after which it is ready for use in the present process.

The following specific example is given by way of illustration:

A mixture of ceramic materials consisting of 1840 parts by weight of 40 grit acid treated fused alumina grain and 160 parts by weight of clay bond are wet with 4 parts by weight of a solution of wetting agent such as a 40% solution of sodium 2-ethyl hexyl sulphate in water, such as that sold under the trade name "Tergitol Penetrant 08." 100 parts by weight of an acid latex containing 44 parts by weight of rubber are then mixed in.

A porous mold, such as a plaster mold, is then wet with a solution consisting of 300 grams of calcium chloride in 1000 cc. of alcohol. The above latex-ceramic mixture is then poured into the mold and vibrated to form a homogeneous mass, after which additional calcium chloride-alcohol solution is poured on top of the mix. After a half hour the latex is sufficiently coagulated by diffusion of the coagulant and withdrawal of the water to permit the molded article to be inverted onto a ceramic plate and washed, dried and fired to burn off the latex and unite the ceramic bond.

Although we have described certain specific embodiments of our invention, we are fully aware that many modifications thereof are possible. For instance, various methods of preparing acid latex may be used and many ceramic mixtures may be used. Other neutral and acid emulsions and dispersions may also be used in place of acid latex. Our invention therefore, is not to be restricted except insofar as is necessitated by the prior art and by the scope of the appended claims.

We claim:

1. In the method of making a ceramic article, the steps which comprise preparing a mixture of ceramic materials of an acidic nature and a distinctly acid rubber latex having a pH value within the range 4.5–7, forming an article therefrom by casting into a suitable mold, drying the article and firing the article to burn off the organic matter and unite the bond.

2. In the method of making a ceramic article, the steps which comprise preparing a mixture of ceramic materials of an acidic nature and a distinctly acid rubber latex, said latex having a pH of 4½ to 7, forming an article from the mixture, drying the article and firing the article to burn out the organic matter and unite the ceramic materials.

3. In the method of making a ceramic article, the steps which comprise preparing a mixture of ceramic materials of an acidic nature and a distinctly acid rubber latex having a pH value within the range 4.5–7, adding a stabilizer to the mixture, forming an article from the mixture, drying the article and firing the article to burn out the organic matter and unite the ceramic materials.

4. A composition of matter for making ceramic articles which comprises ceramic materials of an acidic nature and a distinctly acid rubber latex having a pH value within the range 4.5–7.

5. A composition of matter for making ceramic articles which comprises ceramic materials of an acidic nature, a stabilizer, and a distinctly acid latex, said latex having a pH value within the range 4½ to 7.

6. A composition of matter for making ceramic articles which comprises ceramic materials of an acidic nature, 4% of a formaldehyde solution and a distinctly acid latex, said latex having a pH value within the range 4½ to 7.

7. A composition of matter for making ceramic articles which comprises abrasive granules, ceramic bond containing ceramic ingredients of an acidic nature, and a distinctly acid latex having a pH value in the range 4.5–7.

RAYMOND C. BENNER.
GARRET VAN NIMWEGEN.